M. PASINO.
PAN LIFTER.
APPLICATION FILED MAR. 24, 1908.
916,189.
Patented Mar. 23, 1909.
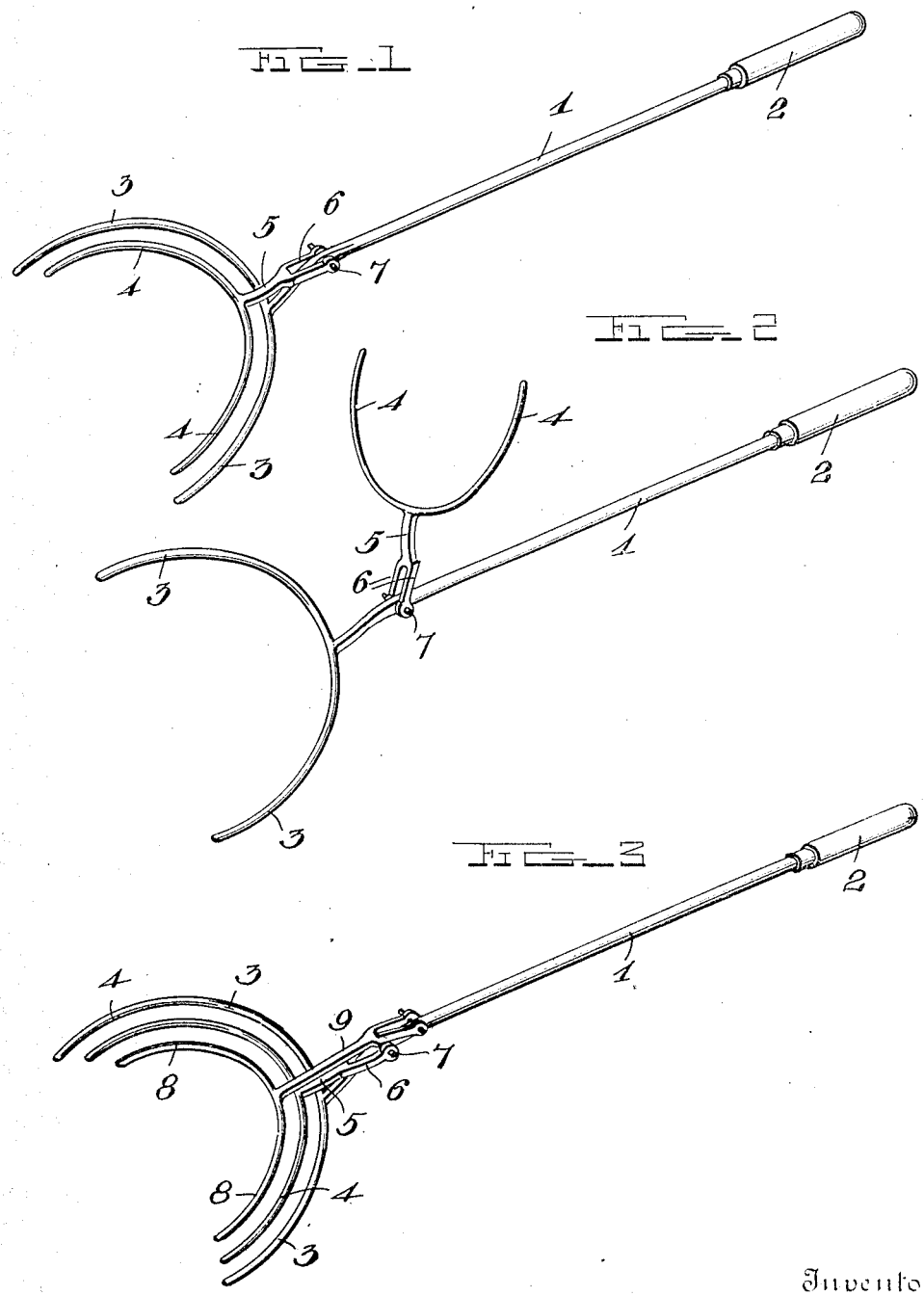
Witnesses
C. H. Griesbauer
Inventor
Mary Pasino
By H. B. Willson & Co.
Attorneys

UNITED STATES PATENT OFFICE.

MARY PASINO, OF CHEBOYGAN, MICHIGAN.

PAN-LIFTER.

No. 916,189.  Specification of Letters Patent.  Patented March 23, 1909.

Application filed March 24, 1908. Serial No. 422,890.

*To all whom it may concern:*

Be it known that I, MARY PASINO, a citizen of the United States, residing at Cheboygan, in the county of Cheboygan and State of Michigan, have invented certain new and useful Improvements in Pan-Lifters; and I do declare the following to be a full, clear, and exact description of the invention, such as will enable others skilled in the art to which it appertains to make and use the same.

This invention relates to kitchen articles and has for its object to provide a device by which hot cakes or pies or the like may be removed from the oven of a stove.

Another object is to provide a device of this kind which is easily adjustable to various sizes of pans and which may be cheaply manufactured and which will not get out of order.

For these and other objects which will more fully appear hereinafter, my invention consists of certain novel features, arrangements and combinations of parts of which the herein described pan lifter is one of many possible embodiments.

While herein I have described many details of my invention, I do not limit myself to these as the details of construction, and combination may be greatly varied without departing from the spirit and scope of the invention.

In the annexed drawing forming a part of this specification, in which like reference numerals refer to like parts through the several views, and which are for illustrative purposes only, and therefore not drawn to any particular scale, Figure 1 is a perspective view of a pan lifter showing the same adjusted for small pans; Fig. 2 is a similar view showing the lifter adjusted for large pans; Fig. 3 is a perspective view of the pan lifter showing three sizes of adjustment.

The pan lifter comprises an elongated rod 1 having at one end a suitable handle of some heat non-conducting material and a pair of arc shaped arms 3 rigidly secured to the forward end of the rod 1. The arms 3 are true arcs of a circumference the radius of which is such a size that the arms will conveniently slip under the rim of a pie or cake-pan or the like and firmly engage the same to remove the pan from the oven of a stove or place the same in the oven.

The device as thus described is complete and operative but in order to have the pan lifter adjustable for different sizes of pans an additional set of arms 4 is provided, the same being integrally secured to the pivot piece 5 having prongs 6 pivoted to the rod 1 by means of the pin 7 passing through the free ends of said prongs and through said rod. The arms 4 form an arc which is of smaller radius than the arc formed by the arms 3 and are adapted to pick up pans of smaller size. If desired the pan lifter may be provided with any number of additional pairs of arms 8 secured to the additional pivoting piece 9 which is in the same manner as the piece 5 pivoted to the rod 1 intermediate of pivot pin 7 and the handle 2 but near the pivot 7. In Fig. 3 I show one additional pair of arms 8 but it is strictly understood that I may use only the stationary arms 3 if desired, but may use the pivot arms 4 and if desired any number of additional arms 8.

The operation and advantages of this invention are obvious. When it is desired to lift large plates, the arms 4 are folded back as shown in Fig. 2. If smaller pans are to be lifted, the arms 4 are folded forward and used to lift the pan. If still smaller pans are to be lifted the arms 8 are used.

Having thus described my invention, what I claim as new, and desire to secure by Letters-Patent in the United States is:—

A pan lifter comprising an elongated rod, a handle at one end thereof and a depending limiting extension at the other end, a pair of semi-circular pan lifting arms, a bifurcated extension thereon adapted to straddle the rod above the end of said extension so as to limit said arms in either direction and to maintain their alinement with the rod when in operative position, and a pivot pin passing through the bifurcated extension and the rod.

In testimony whereof I have hereunto set my hand in presence of two subscribing witnesses.

MARY PASINO.

Witnesses:
  HENRY BORBER,
  W. J. LYNN.